United States Patent Office 3,245,973
Patented Apr. 12, 1966

3,245,973
PROCESS FOR POLYMERIZING UNSATURATED HYDROCARBONS TO CRYSTALLINE POLYMERS OF REGULATED MOLECULAR WEIGHT
Giulio Natta, Ettore Giachetti, and Italo Pasquon, Milan, Italy, assignors to Montecatini Società Generale per l'Industria Mineraria e Chimica, a corporation of Italy
No Drawing. Filed Nov. 3, 1958, Ser. No. 771,188
Claims priority, application Italy, Nov. 7, 1957, 16,010/57
20 Claims. (Cl. 260—93.5)

This invention relates to an improved process for polymerizing alpha-olefins and other vinyl monomers to prevailingly crystalline high polymers. More particularly, the invention relates to an improved method for polymerizing the alpha-olefins and other vinyl monomers to crystalline polymers having a regulated molecular weight.

Natta et al have disclosed new polymers of the alpha-olefins $CH_2=CHR$ where R is hydrocarbon, which polymers are composed of crystallizable or crystalline macromolecules having, at least for long sections of the main chain, the "isotactic" structure as defined by Natta (JACS March 20, 1955), and of the type as shown in the model below:

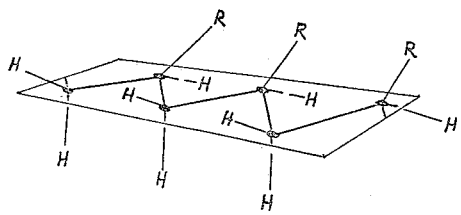

(Model of a portion of the main chain of a crystallizable poly-alpha-olefin, arbitrarily fully extended in a plane, in which portion the R substituents on the tertiary C atoms are all above, and their H atoms below the plane of the chain.)

U.S.P. No. 3,197,452, issued July 27, 1965 to Natta et al. discloses a method for the stereospecific polymerization of aliphatic alpha-olefins to polymerizates consisting prevailingly of the isotactic macromolecules as defined. Such method utilizes catalysts prepared from, preferably, hydrocarbon insoluble crystalline compounds of transition metals of groups IV to VI of the Mendeleeff Periodic Table in which the metal has a valency lower than the maximum corresponding to its position in the Periodic Table, and organometallic compounds of elements of the 2nd and 3rd colums of said table—which do not destroy the crystalline lattice of the transition metal compound.

As disclosed in said application, when the most efficient stereospecific catalysts are used, as for instance the catalyst prepared by mixing solid, crystalline $TiCl_3$ or $VCl_3$ with triethyl aluminum or diethyl beryllium, a polymerizate prevailingly consisting of isotactic macromolecules and of rather high molecular weight is obtained. For instance, by polymerizing propylene with those catalysts at between 0° C. and 100° C., polymerizates consisting prevailingly of isotactic macromolecules are obtained which have, in general, intrinsic viscosities between 2.5 and 4.5 x 100 cc./g., determined in tetrahydronaphthalene at 135° C.

Polymerizates having those high intrinsic viscosities can be used for some purposes, for instances in the production of molded articles. However, for other purposes, such as the production of fibers, polymerizates having lower intrinsic viscosities of about 1.0 to 1.2 x 100 cc./g. are preferred.

It has been disclosed in pending patent applications that the average molecular weight of polypropylene can be regulated by carrying out the polymerization with the catalysts prepared from aluminum trialkyls and titanium or other transition metal halides in which the metal has lower than the maximum valence, under hydrogen pressure. That method results in the production of polypropylenes of satisfactorily regulated average molecular weight. However, it requires relatively high hydrogen pressures and results in a certain loss of propylene because a portion of the monomeric alpha-olefin is hydrogenated to propane during the reaction. Moreover, it is difficult, by that method, to obtain easily controllable polymerization conditions which reproducibly result in polymers having a constant average molecular weight as a function of the polymerization time. Additionally, the process involving use of hydrogen pressure is not as effective with styrene as is desirable.

In general, the use of hydrogen as a regulator of the molecular weight of the polymers tends to reduce the stereospecificity of the catalyst with the result that the amount of isotactic crystalline polymer produced is decreased and the amount of amorphous polymer produced is increased.

It has also been disclosed, in a pending application, that the molecular weight of the polypropylene can be regulated by effecting the polymerization of propylene with the catalysts aforesaid in the presence of suitable concentrations of polar compounds of the type RX where R is hydrogen or an alkyl group, and X is halogen. According to this last-mentioned method, production of polymers having the desired comparatively low molecular weight requires the use of relatively large amounts of the polar compounds RX which cause a reduction in the time of activity and, if the amount of the polar compound is sufficiently large, also a reduction in the stereospecificity of the catalyst.

An object of this invention is to provide an improved, readily reproducible method of regulating the average molecular weight of the polymers obtained, which method does not have the above-mentioned disadvantages.

This and other objects are accomplished by the present invention in accordance with which it is found, surprisingly, that the disadvantages are avoided by using catalytic systems, prepared from the low valency hydrocarbon insoluble crystalline transition metal compounds and organometallic compounds of aluminum or beryllium, to which there is added a suitable amount of an organometallic compound of an element forming the 1st to 3rd columns of the Mendeleeff Periodic Table which element is different from aluminum or beryllium.

Thus, using catalytic systems based on hydrocarbon insoluble crystalline compounds of the transition metals in which the metal has a valency lower than the maximum (e.g., $TiCl_3$ or $VCl_3$) and organometallic compounds of such elements as aluminum or beryllium, and containing from 0.1% to 15% by volume of an organo-metallic compound of a bivalent metal of the 2nd subgroup of the 2nd group of the Periodic Table, it is possible to regulate the molecular weight of the polymers produced without altering either the activity or the stereospecificity of the catalytic system. This is surprising because the products obtained from the same crystalline transition metal compounds and organometallic compounds of bivalent metals of the 2nd subgroup of the 2nd group of the Periodic Table do not have high catalytic activity or high stereospecificity.

An illustration of the catalytic system used in accordance with the present invention is the system obtained by adding the suitable amount of diethyl zinc, diethyl cadmium or diethyl mercury to a $TiCl_3=Al(C_2H_5)_3$ catalyst. Using that system in the polymerization of propylene it is possible to obtain crystalline polymers having an intrinsic viscosity between 2.5 and 0.2 and which can be varied and predetermined at will depending on the amount of the zinc, mercury or cadmium alkyl added. The addition of the zinc, mercury or cadmium alkyl to the $$TiCl_3 = Al(C_2H_5)_3$$

catalyst does not alter either the high stereospecificity or the high activity of the $TiCl_3 = Al(C_2H_5)_3$ catalyst.

In general, the polymer obtained under the same conditions, using the $TiCl_3 = Al(C_2H_5)_3$ catalyst in the absence of the zinc, mercury or cadmium alkyl has an intrinsic viscosity higher than 2.5.

Even the polymers of the lowest molecular weight (intrinsic viscosity below 1.0) obtained using the catalytic system including the zinc, mercury or cadmium alkyl are highly crystalline. In contrast, the catalysts prepared from $TiCl_3$ and the zinc, mercury or cadmium alkyl alone, have low catalytic activity and the polymers obtained using them exhibit low crystallinity.

Instead of pure zinc, mercury or cadmium alkyls one can use the reaction product of anhydrous zinc, mercury or cadmium chlorides with the corresponding amount of a readily available metal alkyl, such as triethyl aluminum, in a hydrocarbon solvent inert to the catalyst.

In general molar ratios of zinc-, cadmium- or mercury alkyl to aluminum alkyl of between 0.1:1 and 20:1 are used.

The catalytic system of the invention can be used in polymerizing monomers of the type $CH_2 = CHR$ where R is an alkyl group containing from 1 to 6 carbon atoms, an aryl radical, an arylalkyl radical containing from 7 to 10 carbon atoms, or a nuclearly halogenated aryl group, to polymerizates prevailingly consisting of isotactic macromolecules. Specific monomers which can be polymerized to isotactic polymerizates of regulated molecular weight with the present modified catalytic systems include, in addition to propylene, other alpha-olefins such as butene-1, hexene, and styrene, as well as ring-substituted styrenes, e.g., alkyl styrenes, and chlorostyrenes. The present invention is of particular importance in the polymerization of styrene to isotactic polystyrene, being the only practical method so far available for regulating the molecular weight of isotactic polystyrene.

The solid crystalline transition metal compound may be a hydrocarbon insoluble halide of the transition metals of Groups IV to VI of the Mendeleeff Periodic Table, particularly solid crystalline halides of titanium, vanadium, zirconium and chromium.

The organo-metallic compound of the element forming the 2nd and 3rd columns of said Periodic Table may be an alkyl compound of beryllium, or aluminum in which the alkyl groups contain from 2 to 5 carbon atoms.

The additive may be an alkyl compound of an element forming the 1st to 3rd columns of the Mendeleeff Periodic Table in which the element is different from aluminum or beryllium, and in which the alkyl groups contain from 1 to 5 carbon atoms.

The polymerization can be carried out in a hydrocarbon solvent inert to the catalyst, such as n-heptane, pentane, benzene, etc.

A wide range of temperatures can be used from below room temperature up to 220° C. or even somewhat higher.

The polymerization can be effected at atmospheric pressure or at increased pressure.

The following examples are given to illustrate the invention, it being understood that these examples are not intended as limitative.

*Example 1*

Into a 500 cc. shaking autoclave kept at the constant temperature of 70° C. by means of oil circulation, an inert hydrocarbon solvent, $TiCl_3$ and then the solutions of the metal alkyls [$Al(C_2H_5)_3$ and $Zn(C_2H_5)_2$] in the same solvent are introduced under nitrogen.

The autoclave is closed, nitrogen is removed by means of a vacuum pump and the autoclave is agitated while introducing propylene to a pressure of 2.3 atm., which is kept constant during the polymerization by feeding propylene continuously.

After 2½ hours, the polymer is discharged, washed first with a solution of HCl in methanol and then with methanol alone, dried and weighed.

The polymer thus obtained is subjected to extraction with anhydrous ethyl ether and then with anhydrous n-heptane, at their boiling point.

The value of [µ], at 135° in tetrahydronaphthalene, was determined on the residue of the ether extraction.

The results are shown in Table I below. As is evident from the table, in runs 3, 4, 6 and 7, the order of addition of the two metal alkyls was changed with no change in the results.

POLYMERIZATION OF PROPYLENE AT 70° UNDER UNDER 2.3 ATM.

| No. | $TiCl_3$ $10^{-3}$ mols | $Al(C_2H_5)_3$ $10^{-3}$ mols | $Zn(C_2H_5)_2$ $10^{-3}$ mols | Solvent, cc. | Time, hours | Polymer obtained, g. | Fractionation Ether extract, percent | Fractionation n-Heptane extract, percent | Residue Percent | Residue (*) | Residue after extraction [µ] | Residue after extraction (*) | Notes |
|---|---|---|---|---|---|---|---|---|---|---|---|---|---|
| 1 | 1.81 | | 5.1 | 250 benzene | 3 | 0 | | | | | | | |
| 2 | 1.81 | 4.87 | | do | 2.30' | 11.0 | 13.8 | 5.4 | 80.8 | | 3.06 | | |
| 3 | 1.81 | 4.87 | 0.68 | do | 2.30' | 10.6 | 16.5 | 4.3 | 79.2 | | 1.47 | | $Zn(C_2H_5)_2$ introduced last. |
| 4 | 1.81 | 4.87 | 3.4 | do | 2.30' | 11.2 | 13.6 | 11.6 | 74.0 | 64.5 | 0.71 | 56.0 | $Zn(C_2H_5)_2$ introduced first. |
| 5 | 1.81 | 3.7 | | 100 n-heptane | 2.30' | 12.7 | 18.3 | 5.3 | 76.0 | 59.5 | 3.02 | 58.5 | |
| 6 | 1.81 | 3.7 | 3.8 | do | 2.30' | 12.2 | 9.5 | 15.3 | 75.2 | | 0.66 | | $Zn(C_2H_5)_2$ introduced together with $Al(C_2H_5)_3$. |
| 7 | 1.81 | 3.7 | 3.8 | do | 2.30' | 12.4 | 12.5 | 11.5 | 76.0 | 69.5 | 0.69 | 62.0 | $Zn(C_2H_5)_2$ introduced first. |

(*)Percent crystallinity by X-ray examination.

*Example 2*

Into a vessel provided with a stirrer, 60 cc. of a 33% (by volume) styrene solution in benzene are introduced in the absence of air and humidity. 0.7 g. $TiCl_3$ and 1.1 cc. triethyl aluminum solution in benzene are added and the polymerization is carried out at 40° C.

The polymer obtained, after the usual purification, has an intrinsic viscosity of 3.16, as determined in tetrahydronaphthalene at 100° C. By operating under like conditions but with the addition of 0.15 cc. diethyl zinc, a polymer having an intrinsic viscosity of 0.203 is obtained.

*Example 3*

Into a 500 cc. stainless steel oscillating autoclave, kept at the constant temperature of 70° C. by circulation of oil, 0.50 g. $TiCl_3$, a solution of 1 cc. $Al(C_2H_5)_3$ in n-heptane and a solution containing the product obtained by reacting 0.5 g. anhydrous $ZnCl_3$ with 1 cc. $Al(C_2H_5)_3$ in n-heptane are introduced under nitrogen.

Additional n-heptane, dried on sodium, is then added up to a volume of 250 cc. The autoclave is closed, nitrogen is removed by means of a vacuum pump and, while agitating the autoclave, propylene is introduced up to an absolute pressure of 2.3 atm., which is kept constant during the polymerization by feeding propylene continuously.

After 2½ hours, the polymerization is stopped, the polymer is withdrawn and washed first with a solution of hydrochloric acid in methanol and then with pure methanol.

25 g. polymer are obtained which, by fractional extraction give the following results:

| | Percent |
|---|---|
| Ether extract | 13.8 |
| Heptane extract | 14.2 |
| Residue | 73.0 |

Intrinsic viscosity determined on the residue after ether extraction: 0.64.

A run carried out under the same conditions but without adding the product obtained by reacting $ZnCl_2$ with $Al(C_2H_5)_3$, gave 23.2 g. polymer having the following composition:

| | Percent |
|---|---|
| Ether extract | 14.8 |
| Heptane extract | 5.4 |
| Residue | 79.8 |

Intrinsic viscosity determined on the residue after ether extraction: 3.24.

Example 4

Into a 500 cc. stainless steel oscillating autoclave, kept at the constant temperature of 70° C. by circulation of oil, 0.50 g. $TiCl_3$ and a n-heptane solution of 2 cc. $Al(C_2H_5)_2Cl$ and 0.2 cc. $Zn(C_2H_5)_2$ are added under nitrogen. Further n-heptane, dried on sodium, is then added up to a volume of 250 cc.

The autoclave is closed, nitrogen is removed by means of a vacuum pump and, while agitating the autoclave, propylene is introduced up to an absolute pressure of 2.3 atm. which is kept constant during the polymerization by feeding propylene continuously.

After 7 hours the polymerization is stopped, the polymer is withdrawn and washed first with a solution of hydrochloric acid in methanol and then with pure methanol.

10.3 g. polymer were obtained which, after fractionated extraction, gave the following results:

| | Percent |
|---|---|
| Ether extract | 5.5 |
| Heptane extract | 8.3 |
| Residue | 86.2 |

Intrinsic viscosity determined on the residue from the extraction: 1.1.

A run carried out under the same conditions, but without adding $Zn(C_2H_5)_2$, gave 11.5 g. polymer having the following composition:

| | Percent |
|---|---|
| Ether extract | 6.5 |
| Heptane extract | 6.5 |
| Residue | 87.0 |

Intrinsic viscosity, determined on the residue after ether extraction: 4.45.

Example 5

Into a 500 cc. stainless steel oscillating autoclave, kept at the constant temperature of 70° C. by circulation of oil, 0.45 g. $TiCl_3$ and a n-heptane solution containing 0.4 cc. $Be(C_2H_5)_2$ and 0.15 cc. $Zn(C_2H_5)_2$ are introduced under nitrogen. Additional n-heptane dried on sodium is added up to a volume of 250 cc.

The autoclave is closed, nitrogen is removed by means of a vacuum pump and, while agitating the autoclave, propylene is introduced up to an absolute pressure of 2.3 atm., which is kept constant during the polymerization by feeding propylene continuously.

After 2 hours and 30 minutes the polymerization is stopped, the polymer is withdrawn and washed first with a solution of hydrochloric acid in methanol and then with pure methanol.

13.5 g. polymer were obtained, which, after fractionated extraction as described in the previous examples, gave the following results:

| | Percent |
|---|---|
| Ether extract | 4.1 |
| Heptane extract | 6.2 |
| Residue | 89.7 |

The intrinsic viscosity determined on the residue of the ether extraction is 1.30.

A run carried out under the same conditions, but without adding $Zn(C_2H_5)_2$, gave 14.1 g. of polymer having the following composition:

| | Percent |
|---|---|
| Ether extract | 3.7 |
| Heptane extract | 3.6 |
| Residue | 92.7 |

Intrinsic viscosity of the residue from the ether extraction: 4.44.

Example 6

Into a 500 cc. stainless steel oscillating autoclave, kept at a constant temperature of 70° C. by circulation of oil, 0.4 g. microcrystalline $TiCl_3$ (average size of the crystals: $2\mu$), a solution of 1 cc. $Al(C_2H_5)_3$ in n-heptane and a n-heptane solution containing the reaction product of 1 g. anhydrous $CdCl_2$ with 2 cc. $Al(C_2H_5)_3$, are introduced under nitrogen.

More n-heptane, dried on sodium, is added up to a volume of 250 cc.

The autoclave is closed, nitrogen is removed by means of a vacuum pump and, while agitating the autoclave, propylene is introduced up to an absolute pressure of 2.3 atm., which is kept constant during the polymerization by feeding propylene continuously.

After 2½ hours, the polymerization is stopped and the polymer is withdrawn and washed first with a solution of hydrochloric acid in methanol and then with pure methanol.

18.3 g. polymer are obtained which by fractionated extraction, gives the following results:

| | Percent |
|---|---|
| Ether extract | 14 |
| Heptane extract | 16 |
| Residue | 70 |

The intrinsic viscosity of the residue after ether extraction is 1.05.

A run carried out under the same conditions, using the same type of microcrystalline $TiCl_3$, without adding the reaction product of $CdCl_2$ and $Al(C_2H_5)_3$, gave 17.5 g. polymer having the following composition:

| | Percent |
|---|---|
| Ether extract | 13.5 |
| Heptane extract | 3.5 |
| Residue | 83.0 |

The intrinsic viscosity of the residue after ether extraction is 3.55.

Example 7

Into a 500 cc. stainless steel oscillating autoclave, kept at the constant temperature of 70° C. by means of circulation of oil, 0.4 g. microcrystalline $TiCl_3$ (average size of the crystals: $2\mu$), a solution of 1 cc. $Al(C_2H_5)_3$ in n-heptane and a solution of 1 g. $Cd(C_2H_5)_2$ in n-heptane are introduced under nitrogen.

The autoclave is closed, nitrogen is removed by means of a vacuum pump and, while agitating the autoclave, propylene is introduced up to an absolute pressure of 2.3 atm., which is kept constant by feeding propylene continuously.

After 3 hours, the polymerization is stopped, the polymer is withdrawn and washed first with a solution of hydrochloric acid in methanol and then with pure methanol.

24.3 g. polymer were obtained which, by fractionated extraction, gave the following results:

| | Percent |
|---|---|
| Ether extract | 12 |
| Heptane extract | 14 |
| Residue | 74 |

The intrinsic viscosity of the residue after ether extraction is 1.15.

A run carried out under the same conditions, using the same type of microcrystalline $TiCl_3$, but without adding $Cd(C_2H_5)_2$, gave 21 g. polymer having the following composition:

| | Percent |
|---|---|
| Ether extract | 13 |
| Heptane extract | 4 |
| Residue | 83 |

The intrinsic viscosity of the residue after ether extraction is 3.60.

The foregoing examples amply demonstrate the effectiveness of the present catalytic system including the zinc or cadmium alkyl compound, in producing the highly isotactic polymerizates of the different unsaturated monomers under different polymerization conditions. Obviously, other variations may be made. The process of the invention enables the use of the highly active and stereospecific catalysts for the polymerization of the monomers to high isotactic and crystallizable or crystalline polymerizates while at the same time resulting in such polymerizates having a molecular weight or intrinsic viscosity in the desired range. It is intended to include in the scope of the appended claims all such modifications and variations in the method as may be apparent to those skilled in the art.

What is claimed is:

1. In a process for polymerizing propylene to a polymerizate consisting prevailingly of isotactic macromolecules in an inert liquid diluent and in contact with a solid, substantially crystalline catalyst prepared by mixing solid, crystalline titanium trichloride with triethyl aluminum, the improvement which comprises regulating the molecular weight of the polymerizate produced by polymerizing the propylene with said catalyst in the presence of zinc diethyl, the molar ratio of zinc diethyl to triethyl aluminum being from 0.1:1 to 20:1.

2. In a process for polymerizing propylene to a polymerizate consisting prevailingly of isotactic macromolecules, in an inert liquid diluent and in contact with a solid, substantially crystalline catalyst prepared by mixing solid, crystalline titanium trichloride with triethyl aluminum, the improvement which comprises regulating the molecular weight of the polymerizate produced by polymerizing the propylene with said catalyst in the presence of cadmium diethyl, the molar ratio of cadmium diethyl to triethyl aluminum being from 0.1:1 to 20:1.

3. In a process for polymerizing propylene to a polymerizate consisting prevailingly of isotactic macromolecules, in an inert liquid diluent and in contact with a solid, substantially crystalline catalylst prepared by mixing solid, crystalline titanium trichloride with beryllium diethyl, the improvement which comprises regulating the molecular weight of the polymerizate produced by polymerizing the propylene with said catalyst in the presence of zinc diethyl, the molar ratio of zinc diethyl to beryllium diethyl being from 0.1:1 to 20:1.

4. In a process for polymerizing styrene to a polymerizate consisting prevailingly of isotactic macromolecules, in an inert liquid diluent and in contact with a solid, substantially crystalline catalyst prepared by mixing solid, crystalline titanium trichloride with beryllium diethyl, the improvement which comprises regulating the molecular weight of the polymerizate produced by polymerizing the styrene with said catalylst in the presence of zinc diethyl, the molar ratio of zinc diethyl to beryllium diethyl being from 0.1:1 to 20:1.

5. In a process for polymerizing monomers of the general formula $CH_2=CHR$ in which R is selected from the group consisting of alkyl radicals containing from 1 to 6 carbon atoms and the phenyl radical, in an inert liquid diluent and in contact with a catalyst prepared by mixing:
   (1) a solid, highly crystalline halide of a transition metal selected from the group consisting of titanium trichloride and vanadium trichloride, with
   (2) a compound selected from the group consisting of aluminum trialkyls, aluminum dialkyl monochlorides and beryllium dialkyls in which the alkyl groups contain from 2 to 5 carbon atoms, the improvement which comprises adding to the catalytic system, as a molecular weight regulator of the polymerizate produced,
   (3) a compound selected from the group consisting of zinc dialkyls and cadmium dialkyls in which the alkyl radicals contain from 1 to 5 carbon atoms, the molar ratio of the molecular weight regulator of (3) to said compound of (2) being from 0.1:1 to 20:1.

6. The improvement according to claim 5, characterized in that the molecular weight regulator is a zinc dialkyl.

7. The improvement according to claim 5, characterized in that the molecular weight regulator is a cadmium dialkyl.

8. The improvement according to claim 5, characterized in that the catalyst is prepared by mixing titanium trichloride with an aluminum trialkyl, and the molecular weight regulator is a zinc dialkyl.

9. The improvement according to claim 5, characterized in that the catalyst is prepared by mixing vanadium trichloride with an aluminum trialkyl, and the molecular weight regulator is a zinc dialkyl.

10. The improvement according to claim 5, characterized in that the catalyst is prepared by mixing titanium trichloride with an aluminum trialkyl, and the molecular weight regulator is a cadmium dialkyl.

11. The improvement according to claim 5, characterized in that the catalyst is prepared by mixing vanadium trichloride with an aluminum trialkyl, and the molecular weight regulator is a cadmium dialkyl.

12. The improvement according to claim 5, characterized in that the monomer is propylene.

13. The improvement according to claim 5, characterized in that the monomer is butene-1.

14. The improvement according to claim 5, characterized in that the monomer is styrene.

15. A polymerization catalyst prepared by mixing:
   (1) a solid, hydrocarbon-insoluble crystalline halide of a transition metal selected from the group consisting of titanium trichloride and vanadium trichloride, with
   (2) a compound of a metal selected from the group consisting of aluminum trialkyls, aluminum dialkyl monochlorides and beryllium dialkyls, in which the alkyl radicals contain from 2 to 5 carbon atoms, in a liquid diluent inert to the metal compound, and adding to the mixture
   (3) a compound of a metal selected from the group consisting of zinc dialkyls and cadmium dialkyls in which the alkyl radicals contain from 1 to 5 carbon atoms, the molar ratio of the compound (3) to the compound (2) being from 0.1:1 to 20:1.

16. In a process for polymerizing monomers of the general formula $$CH_2=CHR$$

in which R is selected from the group consisting of alkyl radicals containing from 1 to 6 carbon atoms, and the phenyl radical in an inert liquid diluent and in contact with a catalyst prepared by mixing titanium trichloride with a trialkyl aluminum compound in which the alkyl radicals contain from 2 to 5 carbon atoms, the improvement which comprises adding a zinc dialkyl in which the alkyl groups contain from 1 to 5 carbon atoms to the catalytic system, as a regulator of the molecular weight of the polymerizate produced, the molar ratio of the zinc dialkyl to the aluminum trialkyl compound being from 0.1:1 to 20:1.

17. In a process for polymerizing monomers of the general formula

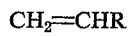

in which R is selected from the group consisting of alkyl radicals containing from 1 to 6 carbon atoms and the phenyl radical, in an inert liquid diluent and in contact with a catalyst prepared by mixing titanium trichloride with a trialkyl aluminum compound in which the alkyl radicals contain from 2 to 5 carbon atoms, the improvement which comprises adding cadmium dialkyl in which the alkyl radicals contain from 1 to 5 carbon atoms to the catalytic system, as a regulator of the molecular weight of the polymerizate produced, the molar ratio of the cadmium dialkyl to the aluminum trialkyl compound being from 0.1:1 to 20:1.

18. In a process for polymerizing monomers of the general formula

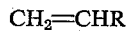

in which R is selected from the group consisting of alkyl radicals containing from 1 to 6 carbon atoms and the phenyl radical, in an inert liquid diluent and in contact with a catalyst prepared by mixing vanadium trichloride with a trialkyl aluminum compound in which the alkyl radicals contain from 2 to 5 carbon atoms, the improvement which comprises adding a cadmium dialkyl in which the alkyl radicals contain from 1 to 5 carbon atoms to the catalytic system, as a regulator of the molecular weight of the polymerizate produced, the molar ratio of the cadmium dialkyl to the aluminum trialkyl compound being from 0.1:1 to 20:1.

19. A process for polymerizing propylene to a solid polymer in an inert liquid diluent with a catalyst prepared by mixing
   (1) titanium trichloride,
   (2) an aluminum alkyl and
   (3) a zinc dialkyl in which the alkyl radicals contain from 1–5 carbon atoms, in an amount sufficient to obtain a reduction in the molecular weight of the solid polymer.

20. A process for polymerizing propylene to a solid polymer which comprises contacting propylene in an inert liquid diluent with a catalyst prepared by mixing
   (1) titanium trichloride,
   (2) an aluminum alkyl and
   (3) a zinc dialkyl in which the alkyl radicals contain from 1–5 carbon atoms, in an amount sufficient to obtain a solid polymer whose molecular weight is substantially lower than that of a polymer obtained in the absence of said zinc dialkyl under otherwise equal conditions.

References Cited by the Examiner

UNITED STATES PATENTS

| | | | |
|---|---|---|---|
| 2,827,447 | 3/1958 | Nowlin et al. | 260—94.9 |
| 2,890,187 | 6/1959 | Bowman et al. | 260—93.7 |

FOREIGN PATENTS

| | | |
|---|---|---|
| 789,781 | 1/1958 | Great Britain. |
| 526,101 | 5/1955 | Italy. |

JOSEPH L. SCHOFER, *Primary Examiner.*

B. LANHAM, L. GASTON, M. LIEBMAN, *Examiners.*